United States Patent [19]
Chun et al.

[11] Patent Number: 5,814,185
[45] Date of Patent: Sep. 29, 1998

[54] TWIN SHEET THERMOFORMER

[75] Inventors: Victor L. Chun, Midland; Stephen E. Keeley, Coleman; James H. Kundinger, Auburn, all of Mich.

[73] Assignee: Kvaerner U.S. Inc., South Attleboro, Mass.

[21] Appl. No.: 941,826

[22] Filed: Oct. 1, 1997

[51] Int. Cl.⁶ .................................................. B29C 51/00
[52] U.S. Cl. ........................ 156/580; 156/500; 425/394
[58] Field of Search .................................... 156/228, 358, 156/500, 580, 583.1; 425/394, 503

[56] References Cited

U.S. PATENT DOCUMENTS

| | | | |
|---|---|---|---|
| 3,925,140 | 12/1975 | Brown .................................... | 156/382 |
| 4,093,498 | 6/1978 | Wendell ................................. | 156/494 |
| 4,764,241 | 8/1988 | Makino .................................. | 156/382 |
| 5,427,732 | 6/1995 | Shuert ................................... | 264/545 |
| 5,620,715 | 4/1997 | Hart et al. ............................. | 425/143 |
| 5,658,523 | 8/1997 | Shuert ................................... | 264/545 |

*Primary Examiner*—James Sells
*Attorney, Agent, or Firm*—John R. Benefiel

[57] ABSTRACT

A twin sheet thermoformer apparatus using hydraulic cylinders to draw the upper and lower platens together for uniform seam forming of the part. A flow divider insures uniform travel of each hydraulic cylinder. An adjustment mechanism enables simultaneous adjustment of the position of four locking shafts on one platen coupled to form locking shafts on the other platen preparatory to operation of the hydraulic cylinders. The adjustment mechanism includes nut members each threaded onto a locking shaft with a recirculating chain engaged with a sprocket on each nut member. Driving the chain enables simultaneous adjustment of each shaft to allow the platen positions to be quickly and accurately adjusted. An encoder generates signals corresponding to the lower platen travel caused by operation of the hydraulic cylinders, which are transmitted to the lower platen drive servo motor to drive the lower platen correspondingly.

12 Claims, 4 Drawing Sheets

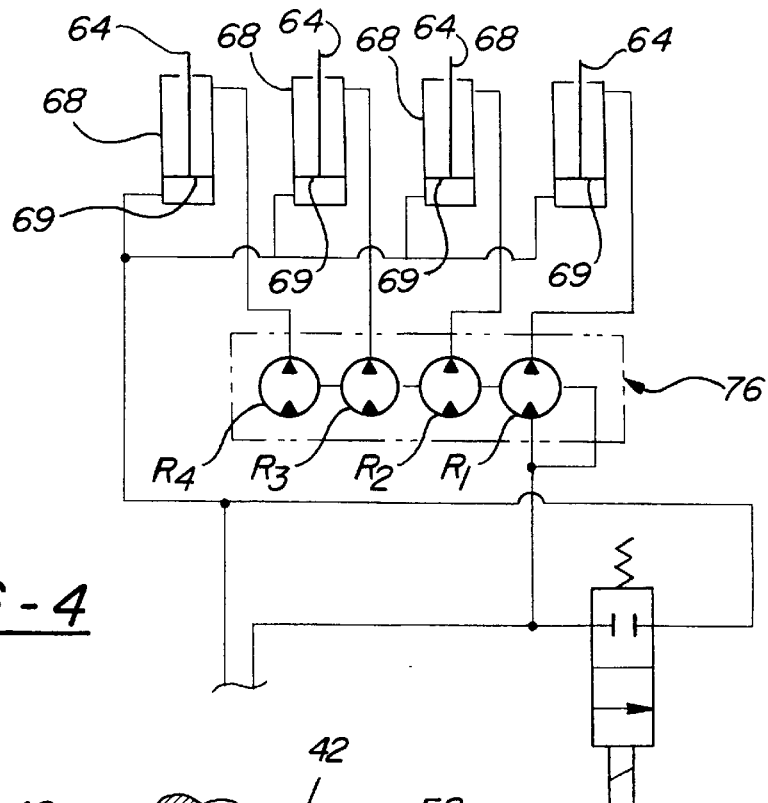
FIG-4
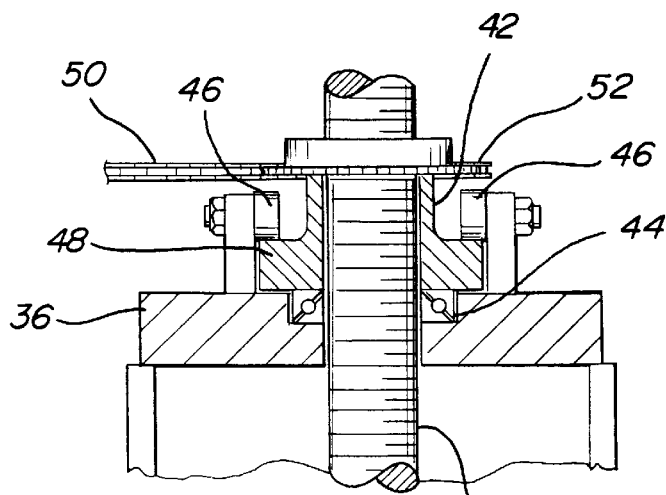
FIG-6
FIG-5
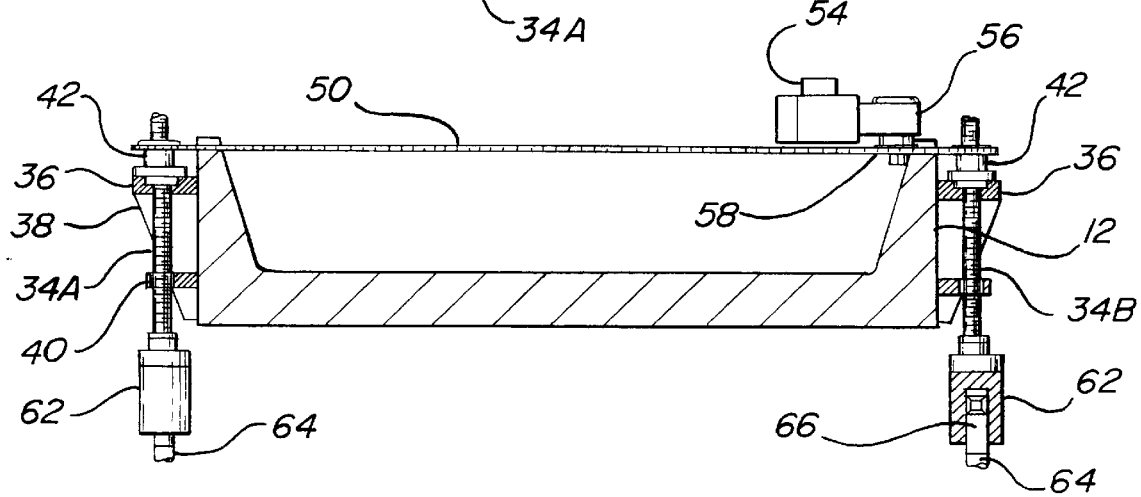

TWIN SHEET THERMOFORMER

BACKGROUND OF THE INVENTION

This invention concerns thermoforming apparatus and more particularly apparatus for forming two preheated sheets of plastic into separate part halves in separate upper and lower molds, the part halves subsequently having their edges sealed together by pressing the upper and lower molds together to form a single unitary part.

Such twin sheet thermoforming apparatus and methods have heretofore been developed to produce such parts as automotive fuel tanks, etc.

The upper and lower molds are installed in respective upper and lower platens which are driven apart to separate the molds sufficiently to allow unloading the completed parts.

U.S. Pat. No. 3,925,140, issued on Dec. 9, 1975 describes such apparatus.

The means for forcing one mold against the other to fuse the part seam has involved the use of a series of inflatable tubes or bags disposed beneath the lower mold.

After the upper and lower platens are locked together using locking shafts engaged by selectively engaged couplings, the inflatable tubes or bags are inflated, lifting the lower mold to be pressed against the upper mold causing the part half perimeters to be fused together.

This arrangement is shown in U.S. Pat. No. 3,925,140, issued on Dec. 9, 1975.

The use of inflatable bags or tubes is effective to apply a fusing pressure but results in an imperfect uniformity of the seam and the final size of the part, since the extent of squeezing may not be completely uniform as there is no positive control over the movement of the mold.

It has been proposed to utilize hydraulic cylinders to squeeze the molds together to improve the uniformity of the seam. However, even with the hydraulic cylinders, the travel of each cylinder must be precisely uniform in order to achieve the end result of uniform squeezing of the seam perimeter. Precision assembly of the components is required in order to accomplish this result. Even so, the temperature of the plastic material may vary slightly such that slightly different travel may occur from different squeezing resistance, the end result also being a nonuniform seam.

As noted, such twin sheet thermoforming apparatus have sets of platen locking shafts carried by the upper and lower platens, which shafts are coupled together when the mold parts are squeezed together. These shafts have each been threaded to a nut component which controls the relative position of the mold parts when the platens are locked together at the initiation of the squeeze cycle, thus predetermining the final seam thickness and part size after the maximum travel of the cylinders has been reached.

To adjust the apparatus such that a different part can be accommodated, it is necessary to adjust the position of each locking shaft. A considerable variation in the depth of the molds can occur for various parts formed by such apparatus. This is a tedious and time consuming task since the adjustments must be uniformly carried out for all of the four shafts usually employed in each set.

Accordingly, it is an object of the present invention to provide a twin sheet thermoformer of the type described in which uniform squeezing of the mold parts is achieved in a simple, relatively low cost manner.

It is another object of the present invention to provide such apparatus in which uniform adjustments of the locking shafts may be made quickly and accurately.

SUMMARY OF THE INVENTION

These and other objects of the present invention, which will be understood upon a reading of the following specification and claims, are achieved by arranging hydraulic cylinders to carry out a pulling action on the platen locking shafts, arranged to create a positively limited relative travel of the molds in being pulled towards each other.

The fluid flow to each cylinder is controlled by routing the hydraulic fluid through a flow divider such that uniform travel of each cylinder piston is insured during the squeezing process, resulting in a uniform depth seam being formed.

The locking shafts on the upper platen are threaded and each are received in a rotatable nut component having a chain sprocket fixedly attached. A driven recirculating chain engages each sprocket nut such that simultaneous rotation of all of the sprocket nuts occurs to precisely execute a uniform simultaneous adjustment of all of the locking shafts on the upper platen. This enables a rapid yet precise adjustment of the relative position of the platens when they are locked together for a given part application.

DESCRIPTION OF THE DRAWINGS

FIG. 4 is a schematic diagram of the four hydraulic cylinders and the flow divider associated therewith according to the present invention.

FIG. 5 is a side elevational view of the upper platen with the connecting shafts and chain-sprocket-nut adjustment mechanism.

FIG. 6 is an enlarged partially sectional view of a sprocket-nut shown in FIG. 5.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
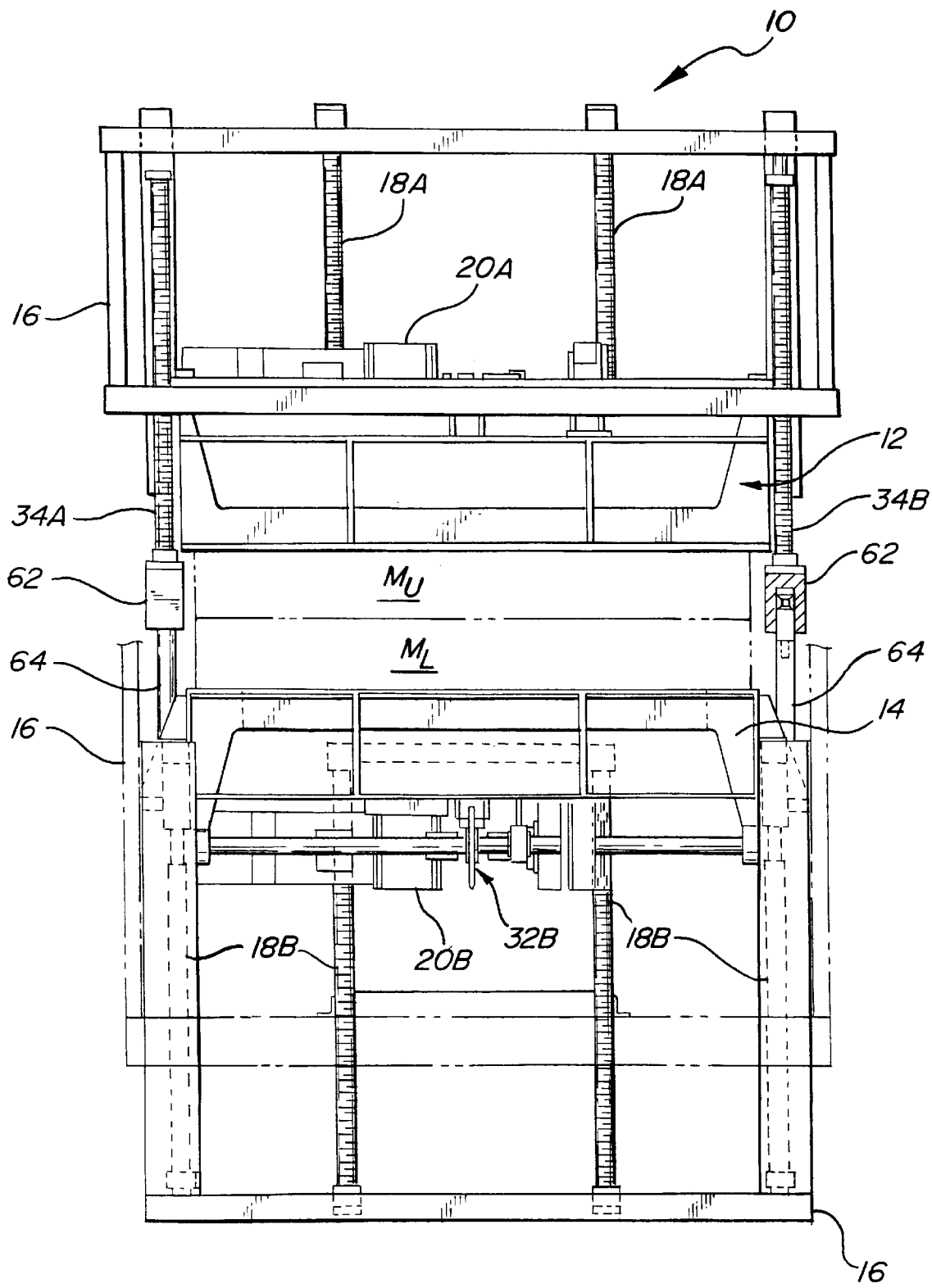
FIG. 1 is a side elevational view of the thermoformer mold-platen apparatus according to the present invention.
Figure 2:
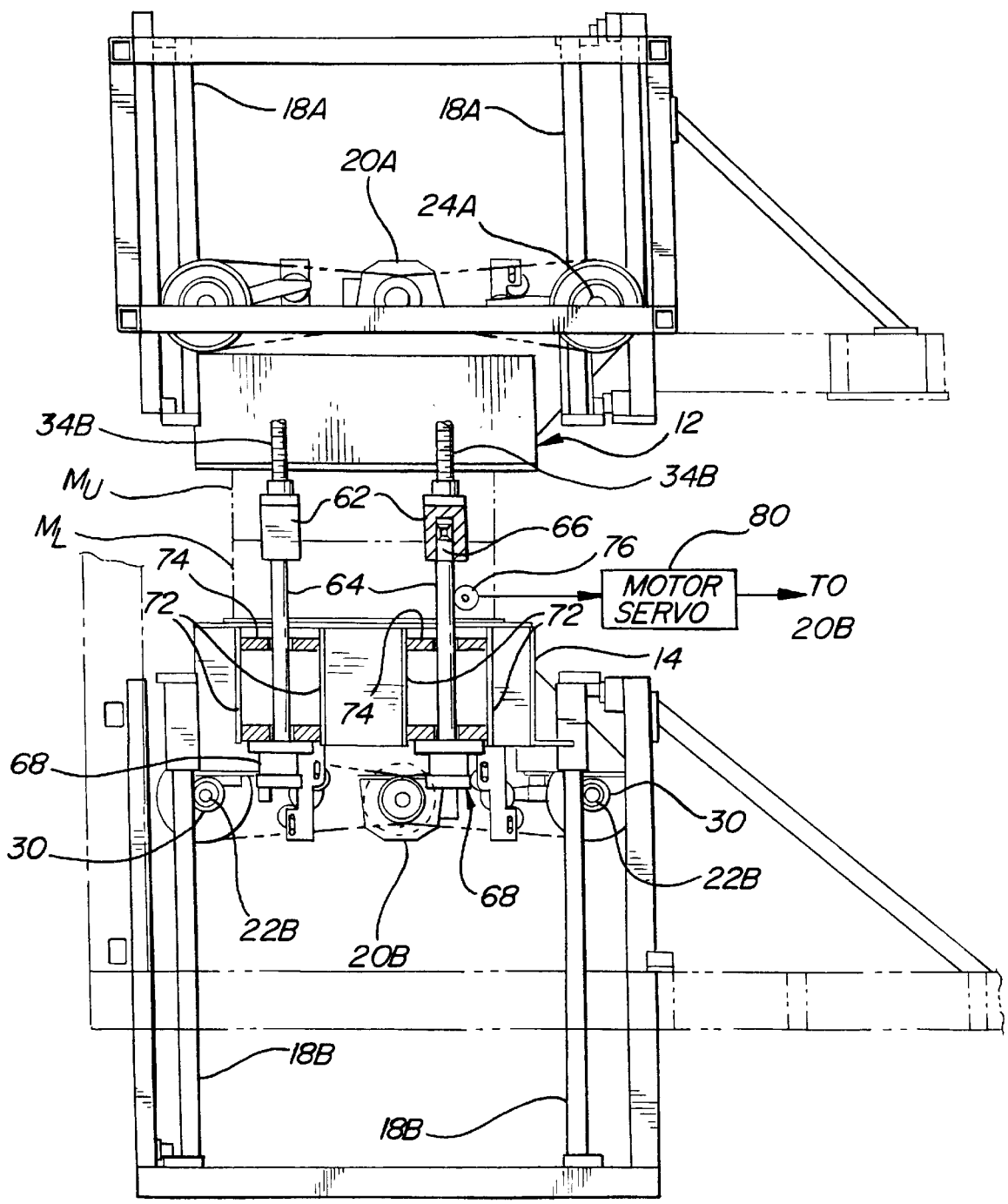
FIG. 2 is an end elevational view of the apparatus shown in FIG. 1.
Figure 3:
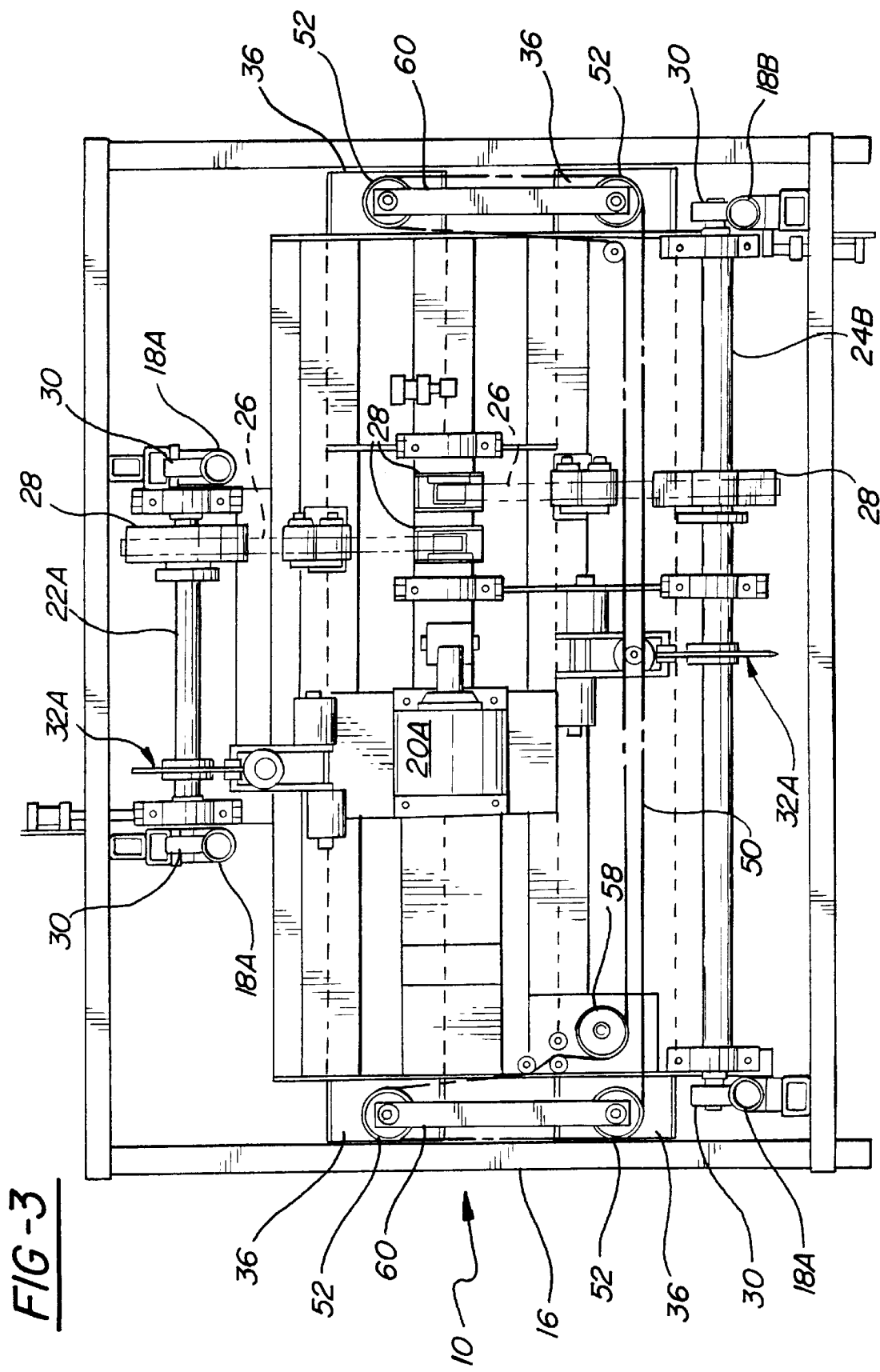
FIG. 3 is a plan view of the apparatus shown in FIGS. 1 and 2.

Referring to FIG. 1, the thermoformer apparatus 10 according to the present invention is shown without certain conventional portions thereof, such as the heating oven, part handling mechanisms, etc. in the interests of clarity, as they do not form a part of the present invention and are well known to those skilled in the art.

The apparatus 10 includes an upper platen 12 and a lower platen 14 each drivably movable up and down within a machine frame, portions 16 shown in FIG. 1.

The upper and lower platens 12, 14 are each supported on respective sets of four gear rack support posts 18A, 18B, the platens 12, 14 adapted to be driven up and down on the posts 18A, 18B, respectively, to thereby be positioned closer or further apart. A drive system for this purpose comprises platen positioning means which includes respective electric drive motors 20A, 20B each driving sets of cross shafts 22A, 22B and 24A, 24B via drive belts 26 and pulleys 28.

The cross shafts 22A, 22B, 24A, 24B each have a pinion gear 30 at each end engaging a respective one of the gear racks machined into the vertical support posts 18A, 18B.

A conventional servo control system is used to control the motors 20A, 20B to drive the upper and lower platens 12, 14 to a predetermined location.

A disc brake 32A, 32B is used to hold the platens 12, 14 in a selected vertical position on the posts 18A, 18B.

The sides of the upper platen 12 carry a first set of vertically extending locking shafts, comprised of pairs of threaded locking shafts 34A, 34B on sets of plates 36 welded to each side of the upper platen 12, reinforcing gussets 38 and shaft guide plates 40 also provided welded to the side of the upper platen 12 (FIG. 6).

Each of the threaded locking shafts 34A, 34B are threadably engaged by being received in nut members 42 disposed over a respective plate 36 and resting on a rotary bearing 44 (FIG. 6).

Hold-down rollers 46 engage a flange 48 so as to prevent the nut members 42 from advancing upwardly on threaded shaft 34A or 34B when rotated.

The four nut members 42 are able to all be simultaneously rotated by means of a recirculating chain 50 engaging a sprocket 52 fixed to each nut member 42. Suitable idler guide sprockets are provided as shown.

The chain 50 is driven by an electric motor 54 and right angle drive 56 rotating a drive sprocket 58 engaging the chain 50.

A bar 60 is fixed across the tops of each pair of threaded locking shafts 34A, 34B to prevent their rotation. Thus, the shafts 34A, 34B are simultaneously rotated when the chain 50 is driven.

This allows adjustment of the relative vertical position of the shafts 34A, 34B on the upper platen 12.

The bottom of each locking shaft 34A, 34B carries a fluid pressure operated coupling mechanism 62 of a well known commercially available type, such as from Locking Cylinder Technologies, Inc. of Racine, Wis. The coupling mechanisms 62 are each aligned with a respective one of a second set of vertical locking shafts, comprised of pairs of hydraulic cylinder shafts 64 projecting upwardly from each side of the lower platen 14. The shafts 64 each have a locking bolt 66 secured to its end adapted to be selectively locked in the aligned coupling mechanism 62 when mechanisms 62 are activated.

The cylinder shafts 64 project upwardly from an associated short stroke hydraulic cylinder 68 secured to a plate 70 welded to a pair of gussets 72, in turn welded to a side of the lower platen 14.

The cylinder shafts 64 are each guided by passing through a bushing in an upwardly spaced plate 74 as shown.

The hydraulic cylinders 68 are of a short stroke high force type, with large forces generated to produce the squeezing of the part rim (not shown). The cylinders 68 preferably are stroked against a fixed stop, as by bottoming of the piston 69 (FIG. 4) against the cylinder endwalls to be positively located when the upper platen 12 and lower platen 14 are fully drawn together. This insures an accurately sized part.

A position encoder 76 generates a control signal corresponding to the travel of the shafts 64.

In order to insure precise uniformity of travel of the cylinder shafts 64, hydraulic fluid under pressure is routed through a flow divider 78 (FIG. 4). The flow divider 78 is a commercially available device (Delta HPR 23-59) resembling a multiple rotor, positive displacement gear motor. Hydraulic fluid to one of the cylinders 68 is routed through one of the rotors $R_1$ causing it to be rotated. The remaining rotors $R_2$–$R_4$ are connected to be rotated in unison therewith.

The hydraulic fluid is gated via these other rotors $R_2$–$R_4$ to the other three cylinders 64. This establishes uniform flow to and thus displacement of each cylinder 68.

In operation, the upper and lower platens are driven to be located properly by motors 20A, 20B to allow heated sheets to be introduced between the molds $M_U$, $M_L$. A conventional thermoforming process is carried out in each mold $M_U$ $M_L$ to form each part half with a flange extending over the outer perimeter of the respective mold faces, in the well known manner.

The molds $M_U$, $M_L$ are brought nearly together, the shafts 64 thereby advanced to be inserted into the coupling mechanisms 62, which are activated to lock the upper platen 12 to the lower platen 14.

Thereafter, the cylinders 68 are pressurized so as to cause the cylinder shafts 64 to be pulled down to draw the molds $M_U$, $M_L$ together, squeezing the part rims together, forming a part seam of a uniform thickness when the cylinders are fully stroked, this stroking proceeding uniformly due to the action of the flow divider 78.

During this time, the upper platen 12 is held by the brakes 32A while the brakes 32 associated with the lower platen 14 are released.

However, the motor 20B is driven by application of the signal from the rotary encoder 76 to the motor servo control 80 so as to cause the lower platen 14 to be driven by the motor 20B to cause the lower platen 14 to "follow" the upward movement of the lower platen 14 caused by the action of the hydraulic cylinders 64.

Thus, the weight of the lower platen 14 is supported by the motor 20B to avoid being added to the weight supported by the brakes holding the upper platen 12.

The platens 12, 14 are thereafter released through deactivation of the coupling mechanisms 62 and release of the brakes 32A to be able to be driven apart and allow the completed part (not shown) to be removed.

In the event a different part is to be made, adjustments due to the mold size differences are easily made by driving the chain 50 to relatively reposition the shafts 34A, 34B and the upper platen 12 as necessary.

A manual operation of the chain drive is possible, as is an automatic programmed powered drive of the chain 50 and nut members 42.

Accordingly, an improved apparatus is provided allowing more accurately sized parts to be produced and allowing rapid and accurate changeover of tooling for parts of different configurations.

We claim:

1. A twin sheet thermoformer apparatus including:
   a frame;
   an upper platen for mounting an upper thermoforming mold, said upper platen movable up and down on said frame through a range of positions thereof;
   upper platen positioner means including platen drive means for selectively moving said upper platen to any position in said range of positions, said positioner means also including means for holding said upper platen stationary at positions within said range;
   a lower platen for mounting a lower thermoforming mold on said frame, said lower platen positioned on said frame below said upper platen and movable up and down thereon towards and away from said upper platen through a range of positions;
   lower platen positioning means including platen drive means for selectively moving said lower platen to any position in said range of positions, said positioning means also including means for holding said lower platen stationary at positions within said range;

a first set of vertical locking shafts mounted to said upper platen and a second set of vertical locking shafts mounted to said lower platen, each locking shaft in said second set aligned with a respective locking shaft in said first set;

coupling means operable to couple said first and second sets of locking shafts together after said upper and lower platen are moved together to a predetermined spacing therebetween;

adjustment means causing one of said first or second sets of locking shafts to be selectively adjusted so that said predetermined spacing between said upper and lower platen whereat said coupling means is operable is varied; and, adjustment drive means for driving each of said adjustment means to cause simultaneous adjustment of said locking shafts in said one of said first or second sets, whereby uniform adjustment of said predetermined spacing is carried out.

2. The apparatus according to claim 1 wherein each of said locking shafts in said one of said first or second sets of locking shafts is threaded and engages a respective nut member, each said nut member rotated by said drive means to carry out said adjustment.

3. The apparatus according to claim 2 wherein each said nut member is captured to prevent axial movement so that each locking shaft is advanced axially as nut members are rotated.

4. The apparatus according to claim 3 wherein said drive means includes a chain recirculated around each nut member, each nut member having a sprocket attached thereto engaged with said chain.

5. The apparatus according to claim 4 wherein said drive means includes a motor driving a drive sprocket to cause recirculation of said chain and simultaneous rotation of said nut members.

6. The apparatus according to claim 1 wherein said actuation means comprises a set of hydraulic cylinders each driving one of said second set of locking shafts to cause said lower platen and upper platen to be drawn together.

7. The apparatus according to claim 6 further including encoder means generating signals corresponding to the upward movement of said lower platen caused by operation of said hydraulic cylinders, said lower platen drive means responsive to said encoder signals to follow said upward movement of said lower platen to support the weight of said lower platen.

8. A twin sheet thermoformer apparatus including:

a frame;

an upper platen for mounting an upper thermoforming mold, said upper platen movable up and down on said frame through a range of positions thereon;

upper platen positioner means including platen drive means for selectively moving said upper platen to any position in said range of positions, said positioner means also including means for holding said upper platen stationary at positions within said range;

a lower platen for mounting a lower thermoforming mold on said frame, said lower platen positioned on said frame below said upper platen and movable up and down thereon towards and away from said upper platen through a range of positions;

lower platen positioning means including platen drive means for selectively moving said lower platen to any position in said range of positions, said positioning means also including means for holding said lower platen stationary at positions within said range;

a first set of vertical locking shafts mounted to said upper platen and a second set of vertical locking shafts mounted to said lower platen, each locking shaft in said second set aligned with a respective locking shaft in said first set;

coupling means operable to couple said first and second sets of locking shafts together after said upper and lower platen are moved together to a predetermined spacing therebetween; and, actuator means including a set of hydraulic cylinders, each hydraulic cylinder pulling one of said locking shafts in one of said first or second sets so as to draw said upper and lower platens together.

9. The apparatus according to claim 8 further including a flow divider means supplying each of said hydraulic cylinders so as to equalize flow to each hydraulic cylinder and insure uniform travel of all portions of said upper and lower platens towards each other.

10. The apparatus according to claim 8 further including means positively limiting the stroke of said hydraulic cylinders to positively limit the travel of said upper and lower platens toward each other by operation of said cylinders.

11. The apparatus according to claim 9 further including encoder means generating signals corresponding to the travel of said lower platen caused by operation of said hydraulic cylinders, said lower platen drive means responsive to said encoder signals to drive said lower platen correspondingly, whereby said platen drive means carries the weight of said lower platen.

12. The apparatus according to claim 9 wherein said flow divider comprises a series of positive displacement rotors coupled together, hydraulic flow to one cylinder caused to drive one rotor which drives the remaining rotors, the remaining rotors gating hydraulic flow to the remaining cylinders.

* * * * *

(12) EX PARTE REEXAMINATION CERTIFICATE (7525th)
United States Patent
Chun et al.

(10) Number: US 5,814,185 C1
(45) Certificate Issued: May 25, 2010

(54) TWIN SHEET THERMOFORMER

(75) Inventors: Victor L. Chun, Midland, MI (US);
Stephen E. Keeley, Coleman, MI (US);
James H. Kundinger, Auburn, MI (US)

(73) Assignee: Brown Machine LLC, Beaverton, MI (US)

Reexamination Request:
No. 90/010,153, Apr. 29, 2008

Reexamination Certificate for:
Patent No.: 5,814,185
Issued: Sep. 29, 1998
Appl. No.: 08/941,826
Filed: Oct. 1, 1997

(51) Int. Cl.
*B29C 51/30* (2006.01)
*B29C 51/38* (2006.01)
*B29C 51/46* (2006.01)
*B29C 51/26* (2006.01)
*B29C 69/00* (2006.01)
*B29C 51/00* (2006.01)

(52) U.S. Cl. .................. 156/580; 156/500; 425/394
(58) Field of Classification Search .................. None
See application file for complete search history.

(56) References Cited

U.S. PATENT DOCUMENTS 3,924,140 A     12/1975  Yannone
3,925,140 A  * 12/1975  Brown ......................... 156/382
5,814,185 A      9/1998  Chun et al.

FOREIGN PATENT DOCUMENTS

| DE | 2 142 997 | 3/1973 |
| DE | 28 20 275 A1 | 1/1980 |
| GB | 2 101 927 A | 1/1983 |

* cited by examiner

*Primary Examiner*—Bruce Campbell

(57) ABSTRACT

A twin sheet thermoformer apparatus using hydraulic cylinders to draw the upper and lower platens together for uniform seam forming of the part. A flow divider insures uniform travel of each hydraulic cylinder. An adjustment mechanism enables simultaneous adjustment of the position of four locking shafts on one platen coupled to form locking shafts on the other platen preparatory to operation of the hydraulic cylinders. The adjustment mechanism includes nut members each threaded onto a locking shaft with a recirculating chain engaged with a sprocket on each nut member. Driving the chain enables simultaneous adjustment of each shaft to allow the platen positions to be quickly and accurately adjusted. An encoder generates signals corresponding to the lower platen travel caused by operation of the hydraulic cylinders, which are transmitted to the lower platen drive servo motor to drive the lower platen correspondingly.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claim 1 is confirmed.

Claim 8 is determined to be patentable as amended.

Claims 2-7 and 9-12 were not reexamined.

8. A twin sheet thermoformer apparatus including:
a frame;
an upper platen for mounting an upper thermoforming mold, said upper platen movable up and down on said frame through a range of positions thereon;
upper platen positioner means including platen drive means for selectively moving said upper platen to any position in said range of positions, said positioner means also including means for holding said upper platen stationary at positions within said range;
a lower platen for mounting a lower thermoforming mold on said frame, said lower platen positioned on said frame below said upper platen and movable up and down thereon towards and away from said upper platen through a range of positions;
lower platen positioning means including platen drive means for selectively moving said lower platen to any position in said range of positions, said positioning means also including means for holding said lower platen stationary at positions within said range;
a first set of vertical locking shafts mounted to said upper platen and a second set of vertical locking shafts mounted to said lower platen, each locking shaft in said second set aligned with a respective locking shaft in said first set;
coupling means operable to couple said first and second sets of locking shafts together after said upper and lower platen are moved together to a predetermined spacing therebetween; and,
actuator means including a set of hydraulic cylinders, each hydraulic cylinder pulling one of said locking shafts in one of said first or second sets so as to draw said upper and lower platens together;
*at least one of said upper platen positioner means or said lower platen positioning means operated to allow said upper and lower platens to be relatively moved and thereby to be drawn together when said actuator means is operated to draw said upper and lower platens together.*

* * * * *